United States Patent [19]

Huggett et al.

[11] E Re. 30,881

[45] Reissued Mar. 16, 1982

[54] WINCH

[75] Inventors: Richard D. J. Huggett, Horndean; William Cook, Cowplain, both of England

[73] Assignee: Lewmar Marine Limited, Hampshire, England

[21] Appl. No.: 204,705

[22] Filed: Nov. 6, 1980

Related U.S. Patent Documents

Reissue of:

[64] Patent No.: 4,208,036
Issued: Jun. 17, 1980
Appl. No.: 928,159
Filed: Jul. 26, 1978

[30] Foreign Application Priority Data

Jul. 27, 1977 [GB] United Kingdom ..... 31611/77

[51] Int. Cl.[3] ..... B66D 1/30

[52] U.S. Cl. ..... 254/345; 74/812; 254/354

[58] Field of Search ..... 254/339, 342–355, 254/369; 74/116, 117, 810, 812; 192/47

[56] References Cited

U.S. PATENT DOCUMENTS

| | | | |
|---|---|---|---|
| 3,145,974 | 8/1964 | Short | 254/344 |
| 3,599,937 | 8/1971 | Carter | 254/344 |
| 3,656,596 | 4/1972 | Morgan | 254/369 |
| 3,728,914 | 4/1973 | Guangorena et al. | 254/354 |
| 3,927,580 | 12/1975 | Fawcett | 254/344 |
| 3,962,935 | 6/1976 | Hutton et al. | 254/344 |
| 3,973,755 | 8/1976 | Fawcett | 254/354 |
| 3,998,431 | 12/1976 | Fawcett | 254/343 |
| 4,054,266 | 10/1977 | Guangorena | 254/345 |

FOREIGN PATENT DOCUMENTS

| | | |
|---|---|---|
| 1368738 | 10/1974 | United Kingdom . |
| 1423139 | 1/1976 | United Kingdom . |
| 1474827 | 5/1977 | United Kingdom . |

*Primary Examiner*—John M. Jillions
*Attorney, Agent, or Firm*—Cushman, Darby & Cushman

[57] ABSTRACT

A manually powered multi-speed winch has an automatic drive disengagement upon drive reversal which is provided by an axially movable member in one drive train which in a first axial position is engageable for drive transmission through a pawl and ratchet unidirectional drive means. The drive means in its drive-transmitting condition prevents movement of the member away from that first position. Upon drive reversal the unidirectional drive means is ineffective either to transmit drive or to maintain the member in its first position and it moves axially to a second position in which the drive means are disengaged. The member is biased towards that second axial position but is manually movable to the first by a control button accessible at the outside of the winch. The button may be lockable to override the automatic disengagement.

11 Claims, 11 Drawing Figures

Figure 1:
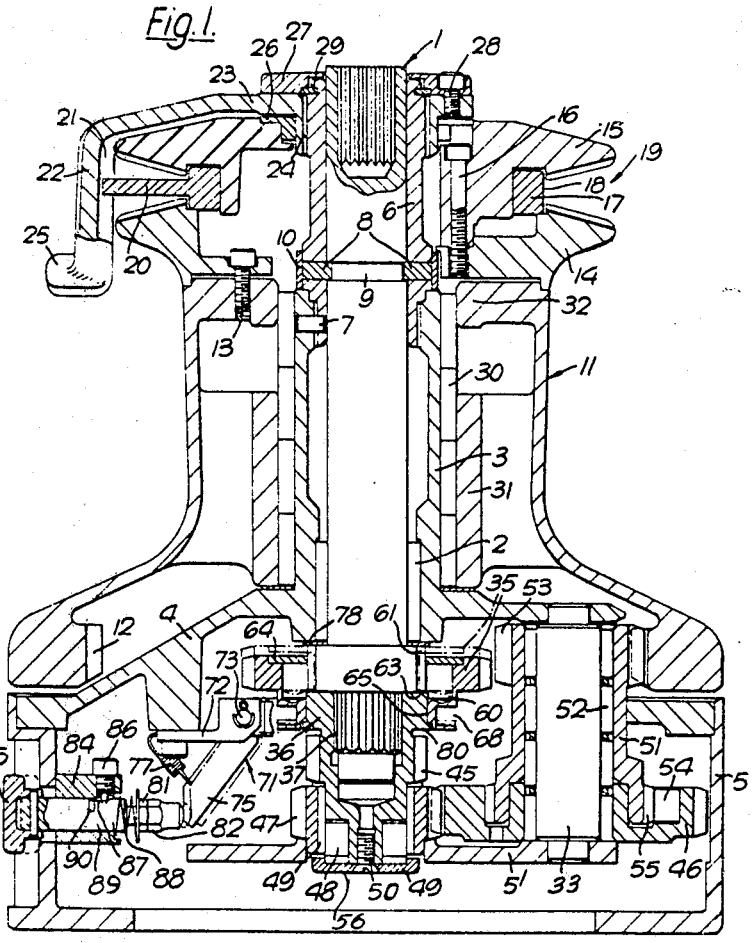

38
4
35
39
68
43
42
45
44
41
47
51
40

WINCH

Matter enclosed in heavy brackets [ ] appears in the original patent but forms no part of this reissue specification; matter printed in italics indicates the additions made by reissue.

FIELD OF THE INVENTION

This invention relates to winches of the manually powered type.

BACKGROUND OF THE INVENTION

Such winches have for some time been provided with a plurality of drive ratios between their drive input and the winch drum and various arrangements have been proposed for allowing interchange between various drive ratios, this interchange being achieved, at least in all the more recent developments, automatically upon reversal of the direction of the drive input, without further manual interference.

There are two sorts of winch to which this interchange is applied.

In a first sort the first speed ratio, the ratio of lowest mechanical advantage to the user, is a 1:1 drive achieved by direct action between a handle and the drum (U.S. Pat. No. 3728914) or through a pawl and ratchet drive one side of which is associated with the drum and the other side of which is associated with the drive shaft (for example, U.S. Pat. No. 3973755).

In a second sort, all the speed ratios involve drive transmission through gear trains. In one line of development illustrated by U.S. Pat. Nos. 3145974 and 4054266 automatic change is provided by means of a movably-mounted traveller gear which is engageable between coplanar transmission pinions while they are rotating in one direction but is driven in an orbital motion out of engagement by their rotation in the opposite direction. The proposals seen in U.S. Pat. Nos. 3927580 and 3998431, on the other hand, use axial movements to engage and automatically disengage drive. In U.S. Pat. No. 3927580 drive coupling to one gear is through a dog clutch which is manually urged into engagement but is positively driven out of engagement by face cams moving it axially when drive is reversed. In U.S. Pat. No. 3,998,431, for a special application, a collar is axially movable to interfere with the driving engagement between pawls on a pinion and a ratchet track on the drive shaft, the pinion and ratchet track being both axially stationary.

SUMMARY OF THE INVENTION

An object of the present invention is to provide an improved automatically ratio-changing winch of either of the sorts outlined above, in which a selector is operated to cause the engagement of a given one of a plurality of drive ratios between the input and the drum, and wherein disengagement of that given ratio is automatic upon reversal of the direction of drive input. In a general embodiment of the invention, selection of the given drive ratio is achieved by providing on a shaft a drive member which is axially moveable along the shaft, the selector means comprising means for moving the member in an axial direction into a drive engaging first axial position where unidirectional drive means between the shaft and the member are engaged, the member being biased away from the said position of engagement to a second axial position where the unidirectional drive means is disengaged to uncouple drive between the shaft and the member, retention of the member in its drive-transmitting position being assured by the unidirectional drive means itself so long as drive continues to be transmitted therethrough between the member and the shaft. One side of the unidirectional drive means moves axially with the member, being associated with it.

Preferably the selector means includes a stirrup engaging a groove on the member and which is pivotally mounted to a frame of the winch, actuation of pivotal movement of the sturrup being by means of a push button accessible to the exterior of the winch. The selector means may further include a lock whereby by a manual operation the member may be retained in its drive engaging position despite reversal of direction of drive input.

Unidirectional drive means particularly conveniently achieving the required characteristics comprise a pawl and ratchet track arrangement with one on the shaft and one on the member. When the ratchet track is on the shaft and a pawl is on the pinion the ratchet track will be adjacent an untoothed cylindrical portion of shaft of a diameter substantially equal to that maximum diameter of the ratchet teeth. Then, as the pawls click over the maximum diameter of the ratchet teeth when drive is reversed they are free to move onto the cylindrical portion of the shaft. This, under the influence of the biassing means, permits movement of the member to its drive disengaging position where the pawls are held free of the ratchet teeth.

In one preferred embodiment the member is a pinion forming part of a gear drive train, being permanently enmeshed with a next pinion in that train in any axial position; in another preferred embodiment the member is a coupling sleeve permanently enmeshed with a second shaft coaxial with the said first shaft, to transmit drive between the shafts in a 1:1 ratio.

DESCRIPTION OF THE DRAWINGS AND OF PREFERRED EMBODIMENTS

Figure 1A:
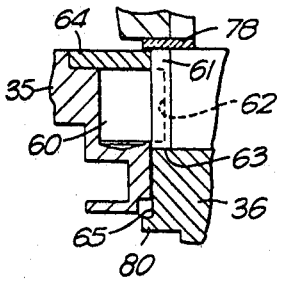
Figure 1B:
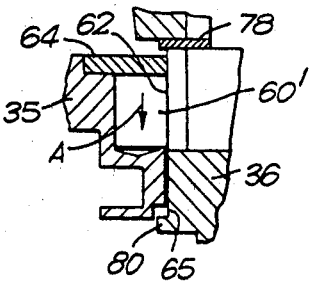
Figure 2:
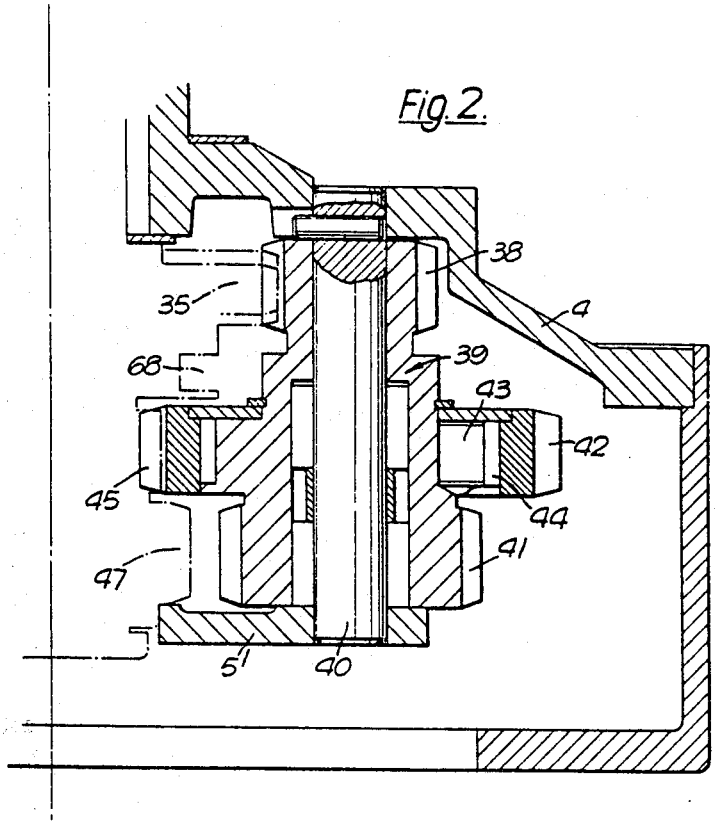
Figure 3A:
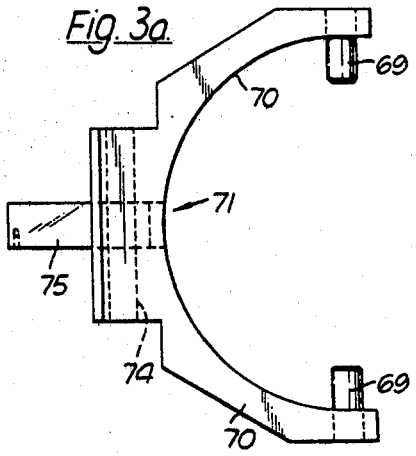
Figure 3B:
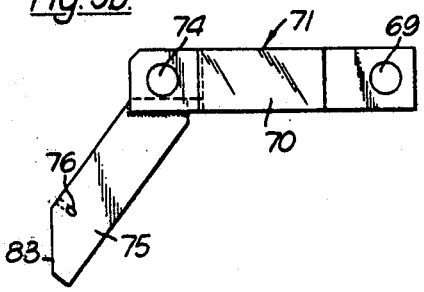
Figure 4:
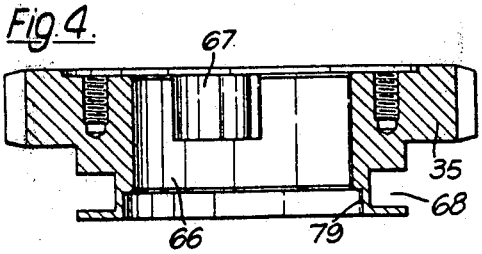
Figure 5:
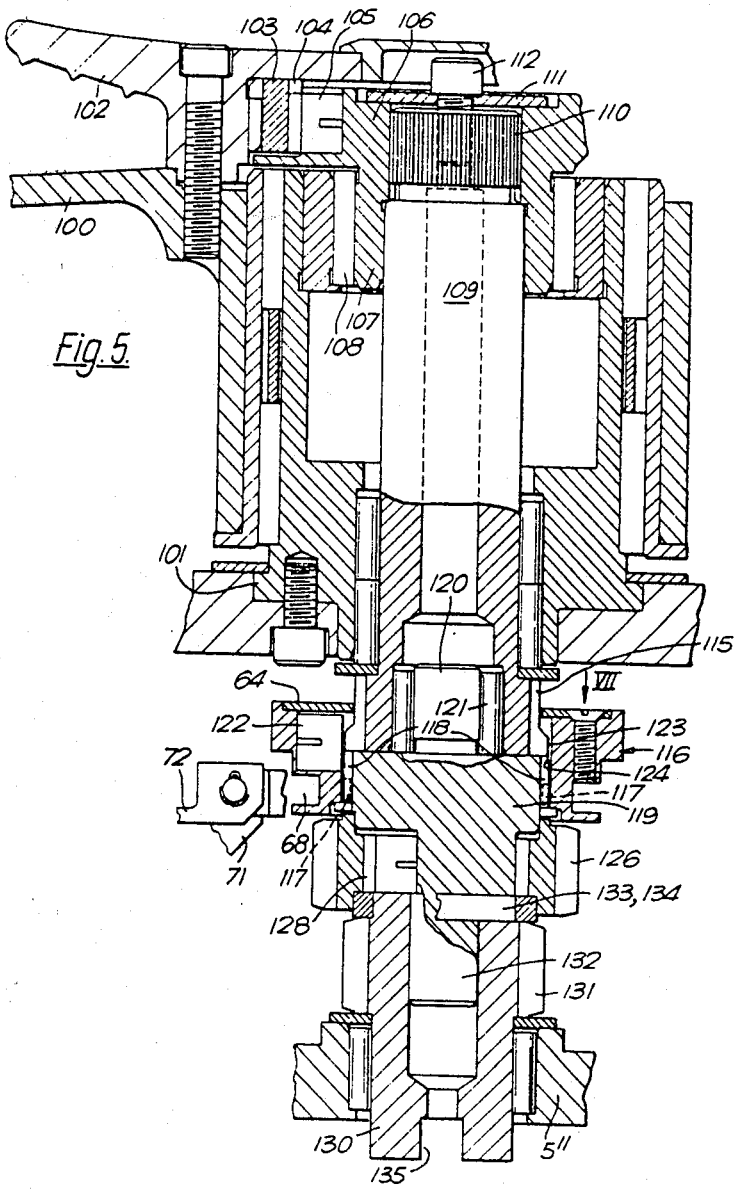
Figure 6:
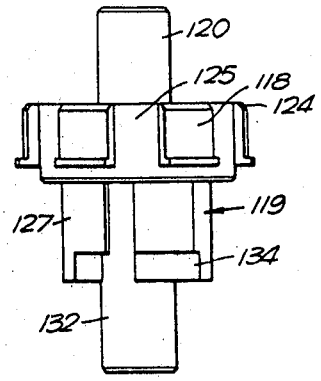
Figure 7:
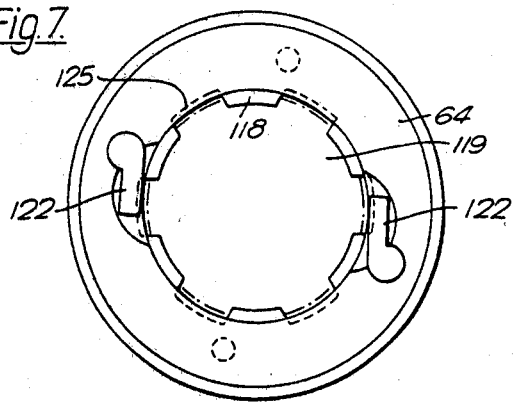
Figure 8:
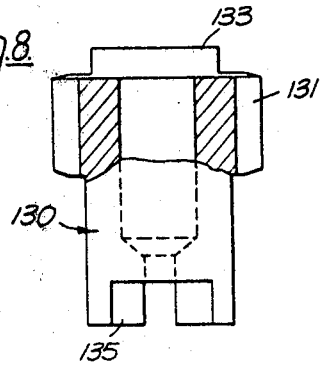

A preferred embodiment of the invention will now be described with reference to the accompanying drawings wherein:

FIG. 1 is a diametrical section embodiment of winch,

FIGS. 1a and 1b are scrap sections from FIG. 1 but showing two other conditions of the movable pinion and unidirectional drive, FIG. 2 is a radial section to show an intermediate stage of the gear train, FIGS. 3a and 3b are side and plan views respectively of a selector fork, FIG. 4 is a side view of a movable pinion, FIG. 5 is a partial diametrical section through a second embodiment, FIG. 6 is a side view of part of the said embodiment, FIG. 7 is a top view of part of the embodiment on the arrow VII of FIG. 5 and FIG. 8 is a side view partially cut away of another portion of the embodiment.

The winch as seen in FIG. 1 is for manual operation and has a central drive shaft 1 which at its middle portion is supported by a rolling contact bearing 2 within a cylindrical sleeve 3. The cylindrical sleeve forms an extension of a flange plate 4 which, together with a base 5 to which it is secured at the top of the latter, forms a stationary framework for the winch. At its uppermost end the sleeve 3 is splined to extension sleeve 6 and these two are axially keyed together by key 7. The extension sleeve 6 forms a centralising bearing for the drive shaft 1. Baseplate 5 is fast with a raised central portion 5' which offers a support for gearing on an extension head of the main drive shaft 1 and for intermediate gearing of the drive transmission trains as will be described more fully later.

Primarily however axial movement of the drive shaft 1 is prevented by keys 8 engaging a groove 9 in that shaft and entering through windows in extension sleeve 6, being held radially by a keeper ring 10 at the outer surface of the latter.

The winch drum 11 has at the inner periphery of its lower edge an internal gear 12 and at its upper edge it is secured by three bolts 13 (only one being shown) to a lower jaw plate 14 of a self-tailing channel 19. In turn there is secured to the lower jaw 14 of the channel an upper jaw 15, by means of three bolts 16 (only one being shown).

Entrapped between the lower and the upper jaws 15,14 is a slip ring 17 which defines a cylindrical base surface 18 of self-tailing channel 19. At one position around the periphery of ring 17 a stripper tongue 20 projects and enters into a vertically extending, inwardly concave channel 21 at the back of the stationary line guide arm 22 which is integral with a top plate 23 which is splined at 24 to an uppermost part of the extension sleeve 6. The line guide has at its lower end an outwardly turned, inclined, line guide 25 which is to guide and assist the transition of line from the surface of the drum 11 into the self-tailing channel 19. A flanged washer 26 is interposed between the stationary top plate 23 and the rotating upper jaw 15, and the top [cao] *cap* 27 is secured by bolts 28 to the top plate and, by entrapping between itself and the top plate 23 a split collar 29 which is housed in a groove in the extension sleeve 6, assures axial positioning of itself and the top plate.

To permit rotation of the drum 11 and the jaws 14,15, rolling contact bearings 30 surround the outer circumference of the sleeve 3 and fit within inner sleeve 31 integral with the drum, and within an upper flange 32 of the drum.

Drive is transmittable between the central drive shaft 1 which has a facetted blind bore for the reception of a stub key from a drive handle, by means of any one of three geared drive transmission trains, all of different drive ratios and being successively engageable upon successive reversals of the direction of turning of the drive shaft so as to transmit between that shaft and the drum successively lower drive ratios i.e. successively higher mechanical advantages. A first and lowest mechanical advantage drive train is provided by pinion 35 which is axially movable upon the drive shaft, being borne on an extension head 36 of the shaft splined at 37 to the lower end of the main portion of the drive shaft 1 and of complex formation which will be described later in more detail.

Pinion 35, in whatever axial position, meshes with pinion train 38 on an intermediate complex gear 39 mounted on intermediate shaft 40 as is seen in FIG. 2. Gear 39 includes another series of integral gear teeth 41 and also provides a support for a gear ring 42 which is engageable with complex gear 39 by unidirectional drive means in the shape of a pawl 43 on the gear 39 and ratchet teeth 44 upon the inner periphery of the ring 42. Gear ring 42 meshes at all times with gear teeth 45 formed on the extension head 36. Teeth 41 however mesh permanently with gear ring 46 which is rotatably borne on a second intermediate gear shaft 33, FIG. 1. The teeth of gear ring 46 mesh permanently not only with teeth 41 on gear 39 but also with geared teeth of a gear ring 47 which is rotatably mounted to the extreme base of the extension head 36 and coupled to that head 36 through a unidirectional drive made up of pawls 48 in the head and ratchet teeth 49 on the inner periphery of the ring 47. These pawls are held in position in the housing and axial position of the ring 47 is assured by end cap 56 secured by screw 50 to the extreme end of the head 36.

The final element of all the gear drive trains is a transmission sleeve 51 mounted, through rolling contact bearings 52, on the second gear shaft 33 and which has at its uppermost end gear teeth 53 which permanently mesh with the internal gear teeth 12 on the drum.

Gear ring 46 is the sole source of drive input to the transmission sleeve 51 and is coupleable to that sleeve by means of unidirectional drive formed by pawls 54 in the gear ring 46 and ratchet teeth 55 formed at the lowermost end of the transmission sleeve 51. The effect of the unidirectional drive 54,55 is to uncouple from any part of the gear drive transmission trains beyond that drive the effect of any overrunning of the winch drum. It has the effect of making all the automatic transmissions which are about to be described entirely independent of overrunning by the drum and controlled only by those factors which are about to be described.

The first drive train that of highest drive transmission between the drive input shaft and the drum and therefore of lowest mechanical advantage is that formed by pinion 35, pinion 38, pinion 41, gear ring 46 and then, in common with all the other drives, transmission sleeve 51, gear teeth 53 and internal gear 12.

The second drive train, of intermediate mechanical advantage, includes ring 47 and gear ring 46.

The third train and that of greatest mechanical advantage includes teeth 45, ring 42, gear 41 and ring 46.

The successive trains have successively odd and even numbers of gears in them and also have successively oppositely opposed unidirectional drives in them (namely in the first train pawls 60 in pinion 35 with ratchet teeth 61 on drive shaft 1, in the second train pawls 43 with ratchet teeth 44 on gear ring 42 and in the third train pawls 48 and ratchet 49).

Thus successive rotation of the drive input shaft in opposite directions would cause transmission of drive successively through different drive ratios. However, if means are not found for disconnecting the first of these drives (that of lowest mechanical advantage) then it will always be preferentially engaged in a given direction of rotation of the main drive shaft, since it will cause a rotation of the gear ring 47 in the third train in a sense that it is overtaking the extension head 36 and is merely clicking past the ratchet teeth 49 on it. Means are therefore provided for the automatic self-disengagement of the pinion 35 upon a first reversal of drive and these will be described in more detail now.

As has been mentioned the pinion 35 is axially movable on the drive shaft of which the head 36 forms part. Head 36 has a smooth cylindrical surface 65 upon which is rotatably borne a smooth cylindrical surface 66 of the pinion 35.

The pawls 60 are housed in pawl housings 67 at an uppermost part of the cylindrical surface 66, being held axially in position by a cover plate 64 (FIG. 1). Level with a lower portion of the cylindrical surface 66 and in the outer periphery of the pinion 35 there is formed a channel 68 which is continuous around that circumference and which is engaged by pins 69 directed inwardly from legs 70 of a fork 71 best seen in FIG. 3. The fork 71 is mounted upon a bracket 72 fixedly secured to the flange 4 and is pivoted to the bracket by a pin 73 passing through a bore 74 in the base of the fork. The fork has an actuating arm 75 extending at an angle to the legs 70, and this has a small aperture 76 for the reception of an end hook of a tension spring 77 of which the other end is anchored in the bracket 72. The effect of the pivotal mounting of the stirrup is that with pins 69 permanently engaged in channel 68 on the pinion 35 the pivoting can in principle cause axial movements of the pinion 35 along the drive shaft. An uppermost axial position is defined by abutment of the cover plate 64 against a washer 78 entrapped between ratchet teeth 61 and the bottom of the cylindrical sleeve 3, and a lower limit position of travel is defined by abutment of an undercut ledge 79 (FIG. 4) in the gear 35 with a flange 80 on the extension head 36. The effect of the tension spring 77 is to bias the stirrup towards clockwise rotation and hence to bias the pinion 35 towards its lower limiting position. The diameter of the cylindrical part 65 of the drive shaft head is substantially equal to the maximum diameter of the ratchet teeth 61. Thus, if the pawls 60 are clicking over the ratchet teeth 61 their innermost edges 62 will be at the same diameter as that of the cylindrical surface 65 and they will be free to transfer downwardly to the cylindrical surface 65. This condition is seen in FIG. 1b, where the pinion 35 is free to move axially in the direction of the arrow A. That this movement will happen when the occasion arises is assisted by the biasing due to the spring 77 (although sufficient biasing may be available by the action of gravity alone). This lowermost axial position of the pinion is seen in full lines in FIG. 1. However, when the pinion 35 has been moved to its uppermost position indicated in dotted line in FIG. 1 and seen more clearly in FIG. 1a, the pawls 60 are fully engageable between the ratchet teeth 61 and their innermost edges 62 penetrate inwardly further than the diameter of the cylindrical surface 65. Thus while they remain engaging between the teeth 61 their axially lowermost edge face abut against a lowermost shelf surface 63 at the foot of those teeth 61 and which is provided by an uppermost planar surface of the head 36. While they are so engaged downward movement of the pinion 35 is impossible whatever the biasing.

To cause the pinion to be moved to its uppermost position in which pawls 60 can engage with and penetrate between teeth 61 an actuating push button is provided which has a stem 89 and lock nuts 81 and 82 on a screwthreaded extension of the stem 89. Lock nut 82 has a rounded nose and abuts against a surface 83 of the arm 75. The stem 89 is axially moveable in a sleeve housing 84 secured to the base 5, and at its end outside the sleeve it is secured to a readily visible and accessible push button head 85. Screw 86 penetrates radially through the housing 84 and its end engages in a slot 87 in the stem 89 to define the limits of movability of the stem. A spring 88 is trapped between the end of the housing 84 and a washer behind the lock nut 81 and urges the stem 89 inwardly, but this spring is much weaker than spring 77 and is overridden by it.

To engage therefore the first drive train, the user of the winch presses the button 85 inwards causing rotation of the fork in an anti-clockwise direction against the biassing of the sleeve 77, moving the pinion 35 to its uppermost position in which the pawls 60 are free to enter between the ratchet teeth 61. Once this position has been established the user is free to release pressure on the button 85 since as has been described, because the pawls remain engaged, the pinion will be held in its drive-engaging position for so long as drive is being transmitted through it upon appropriate rotation of the drive shaft 1.

When however the drive is reversed drive is established through the second gear train 45, 42, and a backward rotation will be imposed (back through gear 38) upon the pinion 35 which will therefore rotate in the opposite direction of the shaft 1 and its pawls 60 will click over the teeth 61 and thereby become free to slide onto the cylindrical surfaces 55 and cause their own permanent disengagement as the pinion moves downwardly down that surface under the influence of gravity and of the tension spring 77.

A further reversal of the drive shaft will cause not re-engagement of the first drive, since the pawls are still held free of the teeth 61, but will cause engagement of the third drive via gear ring 47 and ring 46.

The user may wish that upon any second reversal he will in fact revert to first drive ratio. In this case a lock can be provided upon the selector by virtue of a transverse extension 90 of the slot 87. Then, the user having depressed the push button inwardly gives it a quarter turn so that the end of the screw 86 is engaged in the L-shaped extension 90 and the push button is held locked in its inner position, in which teeth 60 and ratchet 61 are permanently engageable upon appropriate drive.

A second embodiment of the invention can be seen in FIGS. 5 to 8. This illustrates that the principle of the invention may be applied to the sort of manually powered winch in which the lowest mechanical advantage drive train is a 1:1 drive between the drive shaft and the drum. In this winch the axially movable member which causes drive transmission through one drive train or disconnects drive transmission from that drive train is a coupling sleeve permanently meshed with a shaft coaxial with the shaft relative to which it moves axially.

In FIG. 5 only parts associated with this different form of axial member, and relevant to the changes made are shown since the remainder of the structure of the winch, and the selector mechanism which will operate the axially movable member are in substance as previously disclosed.

In this embodiment a winch drum 100 is rotatable on a conventional stationary frame structure schematically indicated at 101. It is secured to a top plate 102 within which is splined a ring 103 with radially inwardly directed ratchet teeth 104. A pawl 105 on a boss element 106 can drivingly engage with the ratchet teeth in a unidirectional drive. The boss element 106 includes a cylindrical part 107 mounted through bearing 108 inside the top end of the stationary structure 101 for rotation relative to it. A centre shaft 109 is borne within the boss part 106 and is splined to it at 110. A retainer plate 111 is screwed to the shaft by screw 112 and bears down on boss 106. If the shaft 109 is rotated in one direction drive will be transmitted in a 1:1 ratio from it through the pawl 105 and ratchet 104, top plate 102 to drum 100. If the drive is in the opposite direction (or if the drum is overrunning the rotation of the shaft) the pawl will click on the ratchet teeth.

This embodiment is one in which drive is brought into the winch from underneath, but in principle it is identical (with appropriate reversal of unidirectional drive linkages) to that where drive is brought to the top end of the centre shaft 109 direct from a handle.

At the lower end of the centre shaft 109 there is a widening on the outer face of which are formed ratchet teeth 115 analogous to teeth 61 of the previous embodiment. A member 116 is axially slidable upon the shaft, this member being analogous to pinion 35 of the first embodiment but differing from it in that, instead of meshing permanently with another gear in the relevant drive transmission (gear 38, FIG. 2, of the first embodiment) it is permanently enmeshed by means of inwardly directed spline teeth 117 with outwardly directed spline teeth 118 on a second shaft 119 mounted coaxially with the centre shaft 109 and rotatable relative to it. Its centering is assured by the projection of an end journal 120 of the shaft 119 to within a hollowed out end of the shaft 109, with the interposition of bearings 121 between them.

The member 116 taking the form of a coupling sleeve between the shaft 109 and 119 has mounted within it pawl 122 analogous to pawl 60 of the first embodiment. It has a channel 68 for engagement by a selector mechanism exactly as in the first embodiment, and a top plate 64.

It can be seen that the maximum diameter of the ratchet teeth 115, at region 123 is just somewhat greater than the minimum diameter of a chamfered-off top portion of the spline teeth 118, this portion being given the reference 124 in FIG. 5. Thus, exactly as in the first embodiment, when the member is in its axially upper position in which pawls 122 engage between teeth 115, and drive is transmitted between shaft 119 and shaft 109 in the appropriate direction, drive is thus transmitted via spline teeth 118 on shaft 109 and spline teeth 117 on the member 116 via pawl 122 on the member 116 to ratchet teeth 115 on the shaft 109. However if the direction of drive input is reversed the pawl 122 will click over the maximum diameter of the ratchet teeth 115 bringing it outwardly of the innermost diameter of the chamfered portion 124 of the splines 118 so that the member 116 is free to move either under gravity or under bias, exactly as described for the previous embodiment, to its lowermost position, that which is indicated in FIG. 5. In this position it can be seen that pawl 122 is held outwardly of maximum diameter of teeth 123 by abutment on the land surface 125 (FIG. 7) of the spline teeth 118 on the shaft member 119.

The shaft is seen in more detail in FIG. 6 with land surfaces 125 chambers 124 and splinings 118 at end portion 120 clearly seen.

The shaft 119 also provides however a rotatable mounting for gear 126 analogous to pinion 47 of the first embodiment forming part of a successive drive train for this multi-speed winch and which is a gear train. A pawl mounted within recess 127 (FIG. 6) with the shaft 119 forms unidirectional drive means between that shaft and ratchet teeth 128 formed on the inner periphery of the pinion 126.

In the specific form being described drive is brought into this shaft complex by an end shaft 130 rotatably borne at the bottom end of the total shaft assembly in base structure 5″ analogous to structure 5′ of the first embodiment. The end shaft 130 has integrally formed in it pinion teeth 131 which (analogously with pinion 45 of the first embodiment) form part of a yet further drive ratio, which is also a gear train. Lower stub axle 132 of the shaft 119 is received in the hollow centre of the end shaft 130, the two shafts 119 and 130 being locked together for rotation together by interaction between plane faces 133 upstanding from the axially upper edge of the pinion teeth 131 with similar plane faces 134 on the lower end of the shaft 119, parallel said faces 133 on the shaft 130 being spaced apart one on each side of a diametrical plane passing through its axis and with a gap between them, faces 134 being correspondingly formed in and spaced apart by the solid material of the shaft 119.

Drive is brought into the assembly by the fitting of a key from a drive transmission train into keyed recess 135 at the extreme lower end of end shaft 130.

In operation the selector is operated against its spring bias to move the member axially upwardly to a position so that pawl 122 penetrates to between ratchet teeth 115 to transmit drive, as previously described, from shaft 119 to shaft 109 whence drive is derived via boss 106 and pawl and ratchet 105, 104 in a 1:1 ratio by winch drum 100. If the direction of drive input is reversed the pawl 122 clicks and the member 106 is free to move axially downwardly, as previously described. The reversal brings automatically into play the next drive ratio to the drum, through gear 131. A second reversal of the direction of drive inputs disconnects the unidirectional drive means in that drive ratio and engages, not the 1:1 drive ratio, but the third ratio—the gear train involving gear 126. The 1:1 drive is not engaged because, as described, in the lower position of the member 106 the pawl 122 is held disengaged from ratchet teeth 115, by being held on a land surface 125 of the spline teeth 118.

We claim:

1. A manually powered winch comprising:

a winch drum rotatable about a central axis;

a drive input;

a plurality of drive trains of respectively different drive ratios between the drive input and the winch drum; and means for causing successive driving engagement of drive trains of successively differing mechanical advantage upon successive reversals of direction of rotation of the drive input to drive the drum in one direction of rotation, said means including a first *axial* shaft, a member of said drive train being mounted [on] *coaxially for axial movement relative to* the shaft [to be axially movable thereon], unidirectional drive means engageable between the member and the shaft and means for biasing the member away from a first axial position toward a second axial position, the member transmitting drive between the drive input and the winch drum, and selector means for moving the member axially from the second axial position to the first axial position, in one of said axial positions the uni-directional drive means being engageable between the member and the shaft and in the other of the said axial positions the uni-directional drive means being disengaged between the member and the shaft, retention of the member in the said one of the axial positions being assured by the drive means for so long as the drive input continues in the direction in which drive is transmitted through said drive means between the member and the shaft.

2. A manually powered winch as claimed in claim 1 wherein the said one of the drive trains is a gear train of least mechanical advantage of the trains, the said member being a pinion in said gear train.

3. A manually powered winch as claimed in claim 1 wherein the said member is a coupling sleeve, and wherein said causing means further includes a second shaft coaxial with the said first shaft, the sleeve being permanently engaged with the second shaft for rotation therewith.

4. A manually powered winch as claimed in claim 1, claim 2 or claim 3 wherein the said axis is vertical, the said first position being the said one of the axial positions and being above the second position, and gravity urging the member from the first to the second position.

5. A manually powered winch as claimed in claim 1, claim 2 or claim 3 wherein the uni-directional drive means comprise a pawl and ratchet track, one of the pawl and the ratchet track being on the member and the other on the first shaft, means defining a ledge at one axial end of the ratchet track nearer the said other of the axial positions, a peripheral diameter of the ledge being substantially identical with that of the ratchet teeth, an edge of a pawl when engaged in the track penetrating to beyond the said peripheral diameter of the ratchet teeth whereby an end face of the pawl abuts the ledge for preventing movement of the member to the said other of the axial positions but clicking of the pawl over the peripheral diameter of the teeth moves the edge of the pawl to the said diameter and frees the pawl from the ledge.

6. A manually powered winch as claimed in claim 1 wherein the selector means includes a manually operable lock for maintaining said member in said one position after reversal of direction of rotation.

7. A manually powered winch comprising:

a winch drum rotatable about a central axis;

a drive input;

a shaft;

a plurality of drive trains of respectively different mechanical advantage, each of said trains including unidirectional drive means for causing said trains of successively progressing mechanical advantage to be successively effective upon successive reversal of the direction of rotation of the drive input, a first of the trains in the said succession including an axially movable member, the movable member being mounted [on] *coaxially for axial movement relative to* the shaft, the unidirectional drive means being operable to transmit drive between the member and the shaft only when the said member is in a first axial position on the shaft, the unidirectional drive means including means effective to maintain the member in the first axial position when this said unidirectional drive means is in driving engagement, motion in the unidirectional drive means in a non-drive-transmitting sense being effective to free the member from the first axial position, biasing means for biasing the member away from the first axial position to a second axial position, the said unidirectional drive means being inoperable when the member is in its second axial position, and selector means manually operable to move the member to its first axial position.

8. A manually powered winch as claimed in claim 7 wherein the said unidirectional drive means is at least one pawl on the member and a ratchet-toothed track on the shaft, there being a ledge in the shaft at one axial end of the ratchet track nearer to the said second position, the ledge having a maximum diameter substantially the same as the maximum diameter of the teeth of the ratchet track, and a smooth, untoothed, portion of the shaft terminating axially at the ledge.

9. A manually powered winch as claimed in claim 8 wherein the selector means includes a fork, a pivotal mounting for the fork, means on the fork engaging an annular groove in the member, a push button movable along its own axis and accessible outside the winch, a pivotal connection between the push button and fork, movement of the push button inwardly of the winch pivoting the fork to move the member axially to its first axial position, and spring means acting on the fork to bias the fork against the said movement.

10. A manually powered winch as claimed in claim 9 wherein the push button is rotatable about its own axis and means effective in one rotated position to hold the button locked in its inward position.

*11. A manually powered winch comprising:*

*a winch drum rotatable about a central axis;*

*drive input;*

*at least first, second and third drive trains of respectively different drive ratios between the drive input and winch drum;*

*means for causing successive driving engagement of said second drive train and disengagement of said first drive train upon a first reversal of direction of rotation of the drive input and driving engagement of said third drive train and disengagement of said second drive train upon a second reversal of direction of rotation of the drive input to drive the drum in one direction of rotation; and*

*means unaffected by a first reversal of the direction of rotation of the drive input engaging said causing means and operable to override and prevent the engagement of said third train by said causing means so that said first train is engaged upon said second reversal of direction of the drive input.*

* * * * *